(12) United States Patent
Bourgoin et al.

(10) Patent No.: US 7,181,886 B2
(45) Date of Patent: Feb. 27, 2007

(54) ORBITAL HYDROPONIC OR AEROPONIC AGRICULTURAL UNIT

(76) Inventors: Eric Bourgoin, 610, RTE 275, C.P. 1003, Ste-Marguerite, Quebec (CA) G0S 2X0; Patrick Charron, 4655, Paquet, Terrebonne, Quebec (CA) J6W 4W5

( * ) Notice: Subject to any disclaimer, the term of this patent is extended or adjusted under 35 U.S.C. 154(b) by 156 days.

(21) Appl. No.: 10/844,915

(22) Filed: May 12, 2004

(65) Prior Publication Data

US 2005/0011119 A1    Jan. 20, 2005

Related U.S. Application Data

(60) Provisional application No. 60/469,587, filed on May 12, 2003.

(51) Int. Cl.
    *A01G 31/00* (2006.01)
    *A01G 31/06* (2006.01)

(52) U.S. Cl. ............ 47/62 A; 47/59 R; 47/62 R; 47/79

(58) Field of Classification Search ........ 47/59 R–63, 47/79–82, 21.1; *A01G 31/06*
See application file for complete search history.

(56) References Cited

U.S. PATENT DOCUMENTS

| | | | |
|---|---|---|---|
| 4,223,094 A | | 9/1980 | Vaseen |
| 4,756,120 A | * | 7/1988 | Arledge ............ 47/59 R |
| 4,765,092 A | * | 8/1988 | Cline ............ 47/61 |
| 4,965,962 A | | 10/1990 | Akagi |
| 5,323,567 A | | 6/1994 | Nakayama et al. |
| 5,617,673 A | * | 4/1997 | Takashima ............ 47/60 |
| 5,862,628 A | | 1/1999 | Takashima |
| 5,873,197 A | * | 2/1999 | Rowse et al. .......... 47/58.1 R |
| 6,061,957 A | * | 5/2000 | Takashima ............ 47/66.1 |
| 6,604,321 B2 | * | 8/2003 | Marchildon ............ 47/62 R |
| 6,840,007 B2 | * | 1/2005 | Leduc et al. ............ 47/62 C |
| 2005/0039396 A1 | * | 2/2005 | Marchildon ............ 47/62 E |
| 2005/0055878 A1 | * | 3/2005 | Dumont ............ 47/62 R |

FOREIGN PATENT DOCUMENTS

| | | | | |
|---|---|---|---|---|
| CA | 2396317 | | * | 8/2002 |
| JP | 2001128571 A | | * | 5/2001 |
| JP | 2004290165 A | | * | 10/2004 |
| RU | 2034448 C | | * | 5/1995 |
| WO | WO 85/05535 | | * | 12/1985 |
| WO | WO 95/26623 | | * | 10/1995 |

OTHER PUBLICATIONS www.omegagarden.com.

* cited by examiner

*Primary Examiner*—Andrea M. Valenti

(57) ABSTRACT

An hydroponic/aeroponic agricultural unit that involves sealing the plants in a highly water saturated environment which more closely recreates the feel of natural rainwater. Also, this invention features the ability of quickly changing from a small housing into a larger housing by varying the diameter of a drum so that a small drum can act as a nursery for seedlings. Once the seedlings have turned into plants, the drum is made larger. The plurality of planks making up the drum can be positioned close to the lamp when they are small and farther away when larger. A simple yet reliable system allows for the rotation of the drum.

13 Claims, 8 Drawing Sheets

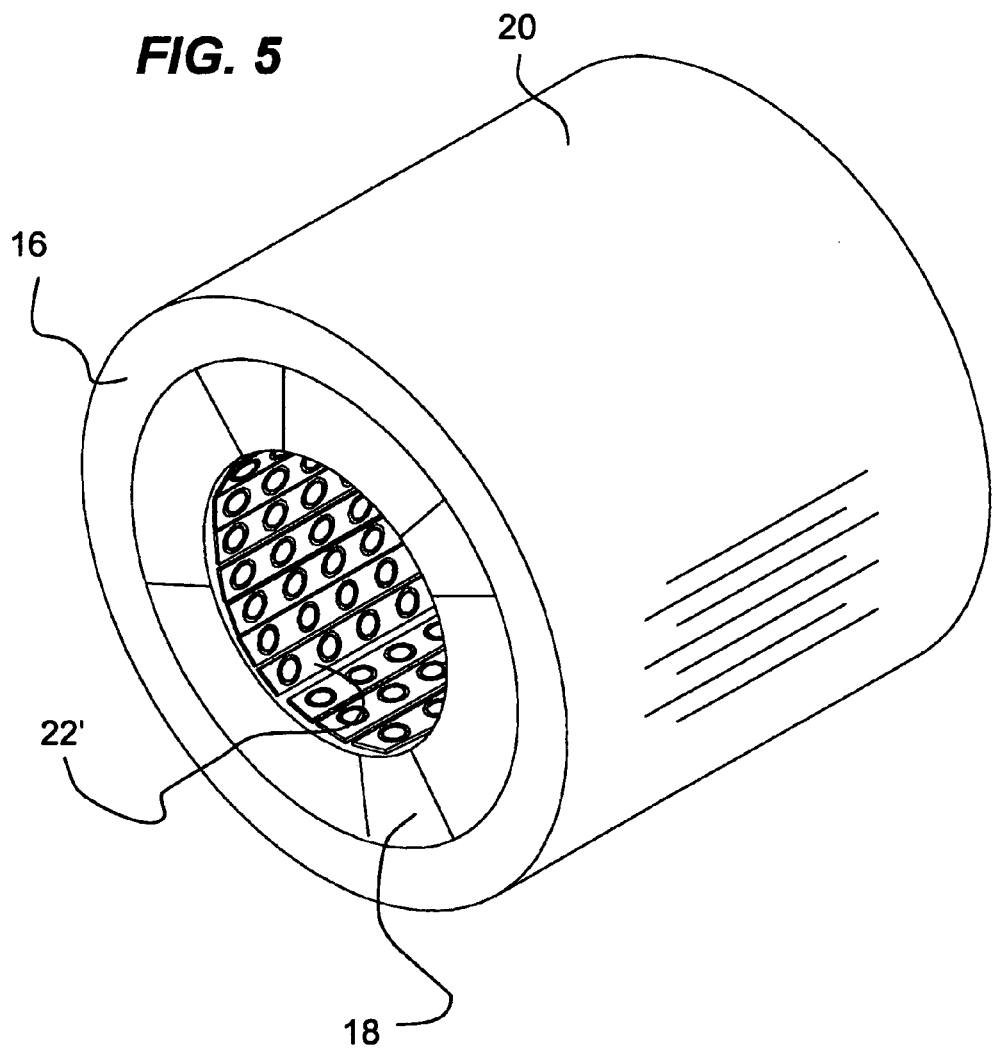

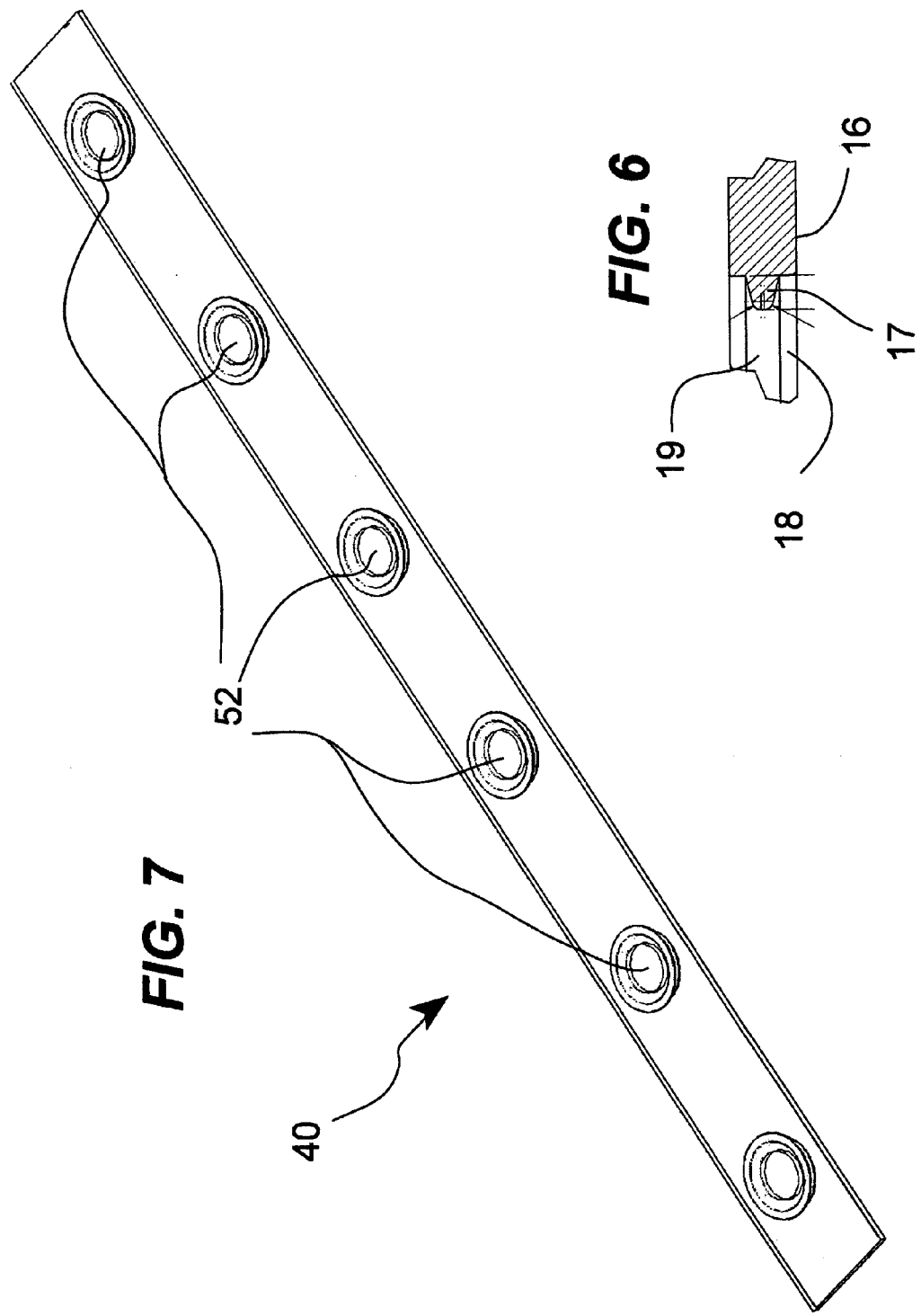

ORBITAL HYDROPONIC OR AEROPONIC AGRICULTURAL UNIT

Figure 1:
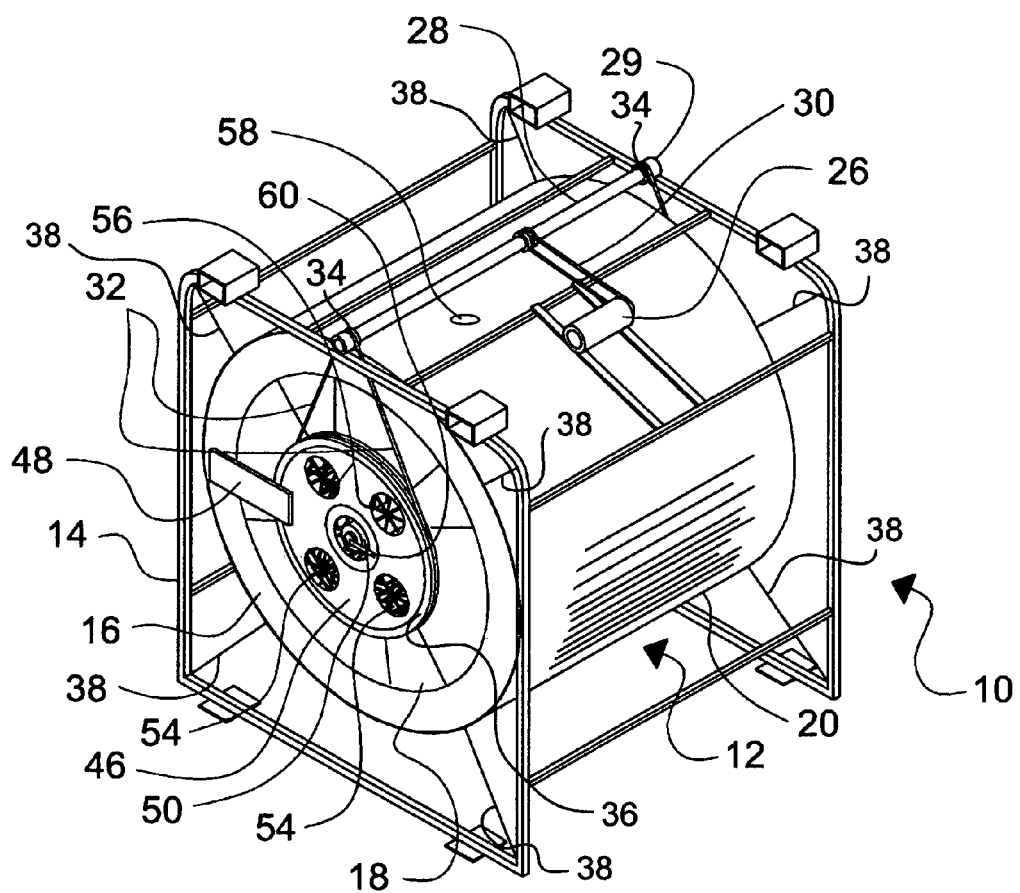

This application claims priority based on provisional application 60/469,587 filed May 12, 2003

BACKGROUND OF THE INVENTION

1. Field of the invention

This invention relates generally to greenhouse agriculture but more specifically to a rotating hydroponic or aeroponic agricultural unit.

2. Background

Recent advances in the study of plants and agriculture have yielded new methods of making plants grow. Generally, it has been found that water that is highly saturated with nutrients is as effective if not more than traditional soil based agriculture. This new method is known generally as hydroponic culture. Derived from hydroponic culture is aeroponic culture which pushes the limit even further by having the nutrient rich water merely sprayed over the plants that are suspended from racks.

The prior art reveals different methods for hanging plants and moving them so that they receive an appropriate mix of water and light.

There are also patented as well as unpatented products which disclose the use of a rotating drum inside which are grown plants. It has been found that rotating plants activates auxins, which are plant growth hormones. This phenomenon which can create unusual shapes to plants is known as orbitropism. An example of an orbitropic system can be found at www.omegagarden.com (excerpts of which are enclosed with the IDS) which discloses a horizontally rotating open drum having a water basin at its base and into which roots of plants are dipped in. The Omega garden system uses a hydroponic system which does not bathe the entire plant in nutrient rich water. This process is different from the natural process of rainfall which touches every parts of the plant first and then the root system after rainwater has percolated down into the soil.

SUMMARY OF THE INVENTION

This instant invention uses primarily an aeroponic system—although by adding a basin at the bottom, it could also be used as a hydroponic system—which involves sealing the plants in a highly water saturated environment which more closely recreates the feel of natural rainwater. Also, this invention features the ability of quickly changing from a small housing into a larger housing by varying the diameter of a drum so that a small drum can act as a nursery for seedlings. Once the seedlings have turned into plants, the drum is made larger. The plurality of planks making up the drum can be positioned close to the lamp when they are small and farther away when larger. A simple yet reliable system allows for the rotation of the drum.

It is a first object of this invention to provide for an hydroponic/aeroponic agricultural unit having a horizontal cylindrical rotating support for plants with no central shaft.

It is a second object of this invention to provide for an hydroponic/aeroponic agricultural unit that provides light and CO2 to promote plant growth.

It is a third object of this invention to provide for an hydroponic/aeroponic agricultural unit that provides nutrient rich spray directly to the root system.

It is a fourth object of this invention to provide for an hydroponic/aeroponic agricultural unit that provides a variable speed motor for spinning a drum at different speed so as to optimize production of auxin hormones.

It is a fifth object of this invention to provide for an hydroponic/aeroponic agricultural unit that is designed to be sturdy, lightweight, easy to assemble and compact for shipping.

It is a sixth object of this invention to provide for an hydroponic/aeroponic agricultural unit that can be stacked.

In order to do so, the present invention consists of a horizontally rotating cylindrical support for plants that allows for different cycles of watering and illumination in order to promote plant growth.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE PREFERRED EMBODIMENT

FIG. 1 Orthogonal view of the unit shown in transparency.

Figure 2:
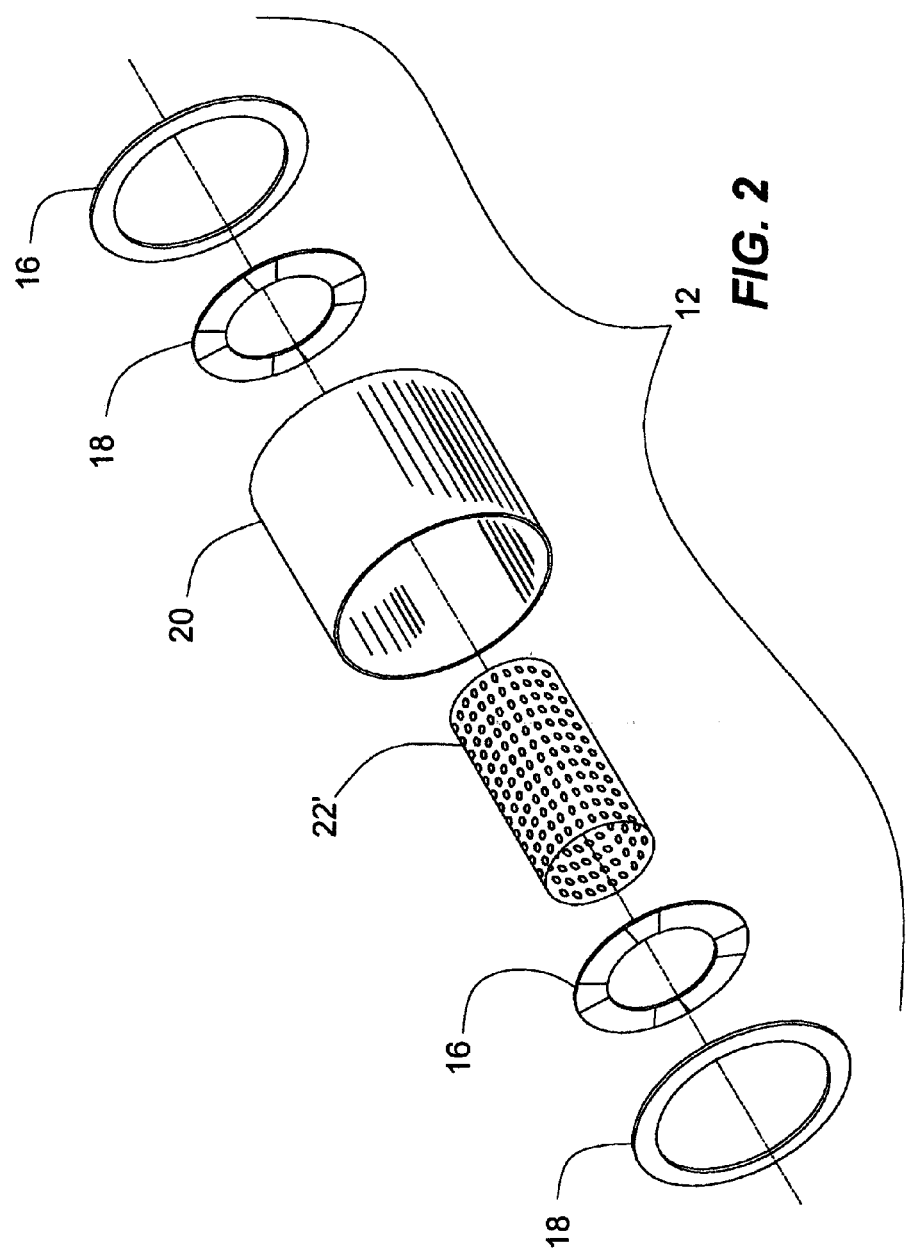

FIG. 2 Exploded orthogonal view of the unit.

Figure 3:
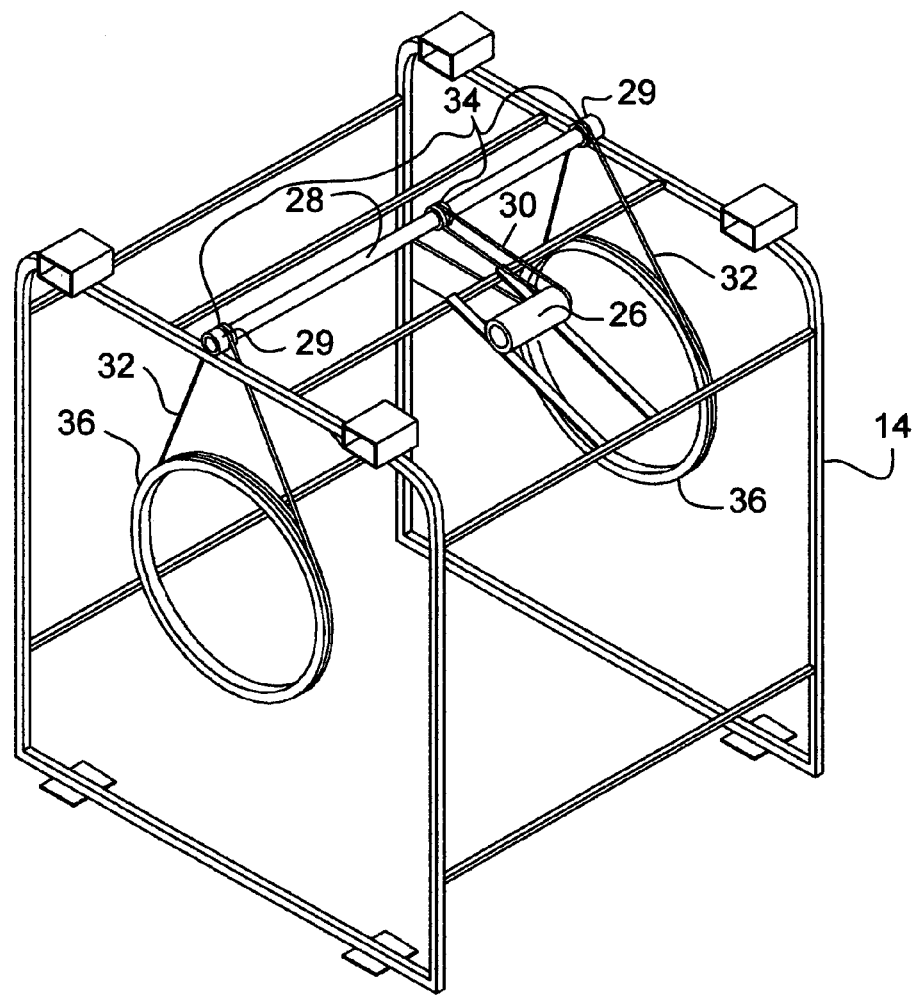

FIG. 3 Orthogonal view of the frame.

Figure 4:
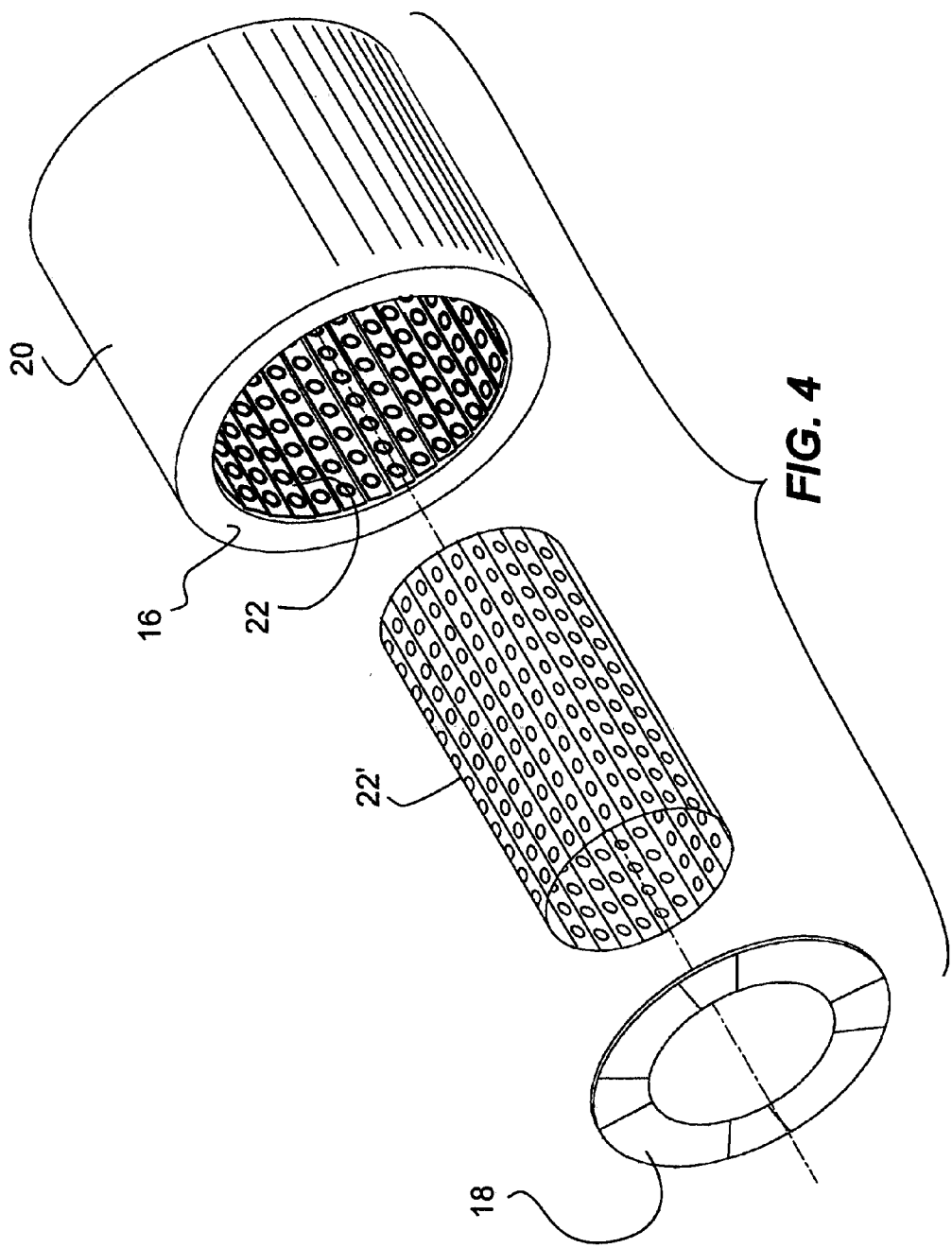

FIG. 4 Orthogonal view of the drum shown in transparency.

FIG. 5 Orthogonal view of the drum with inner drum all shown in transparency.

FIG. 6 Cutaway detail of interface between rotating ring and fixed ring.

FIG. 7 Orthogonal view of a plank.

Figure 8:
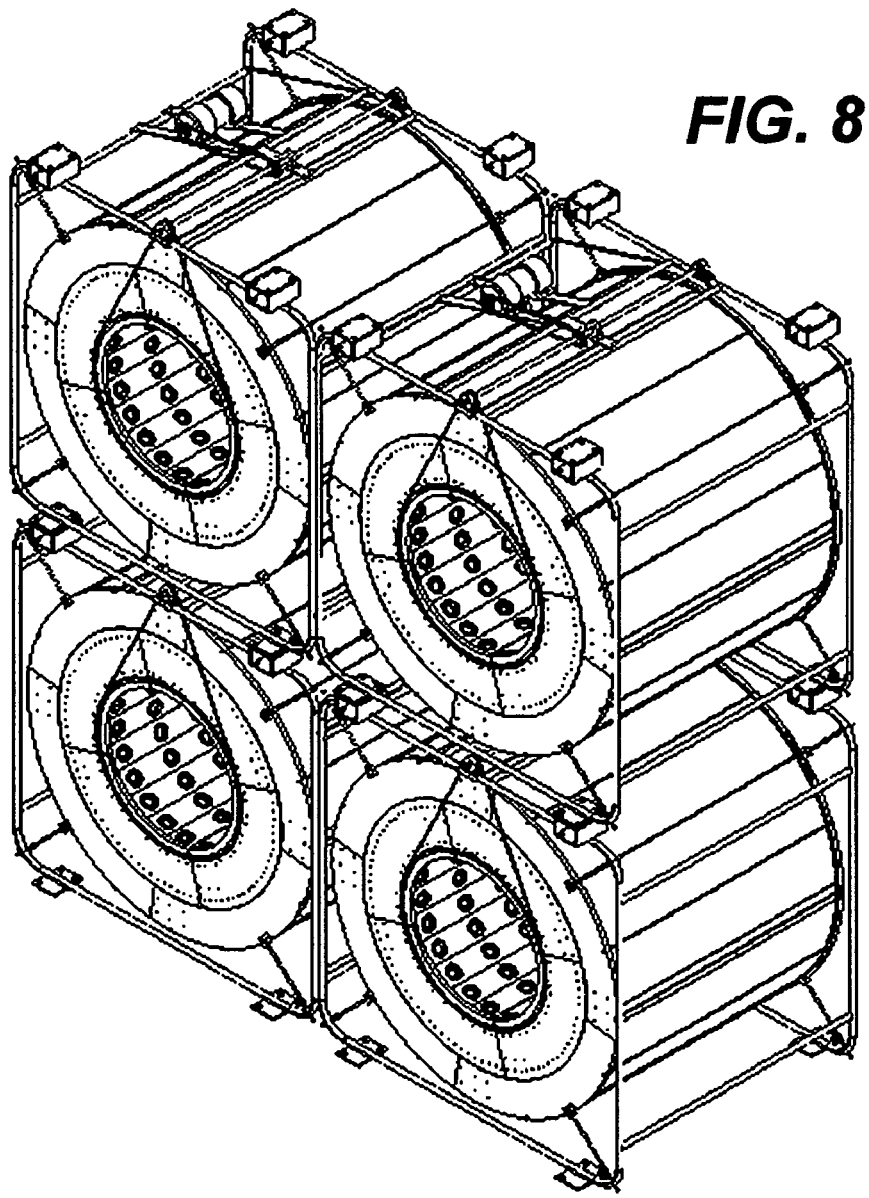

FIG. 8 Orthogonal view of stacked units.

Figure 9:
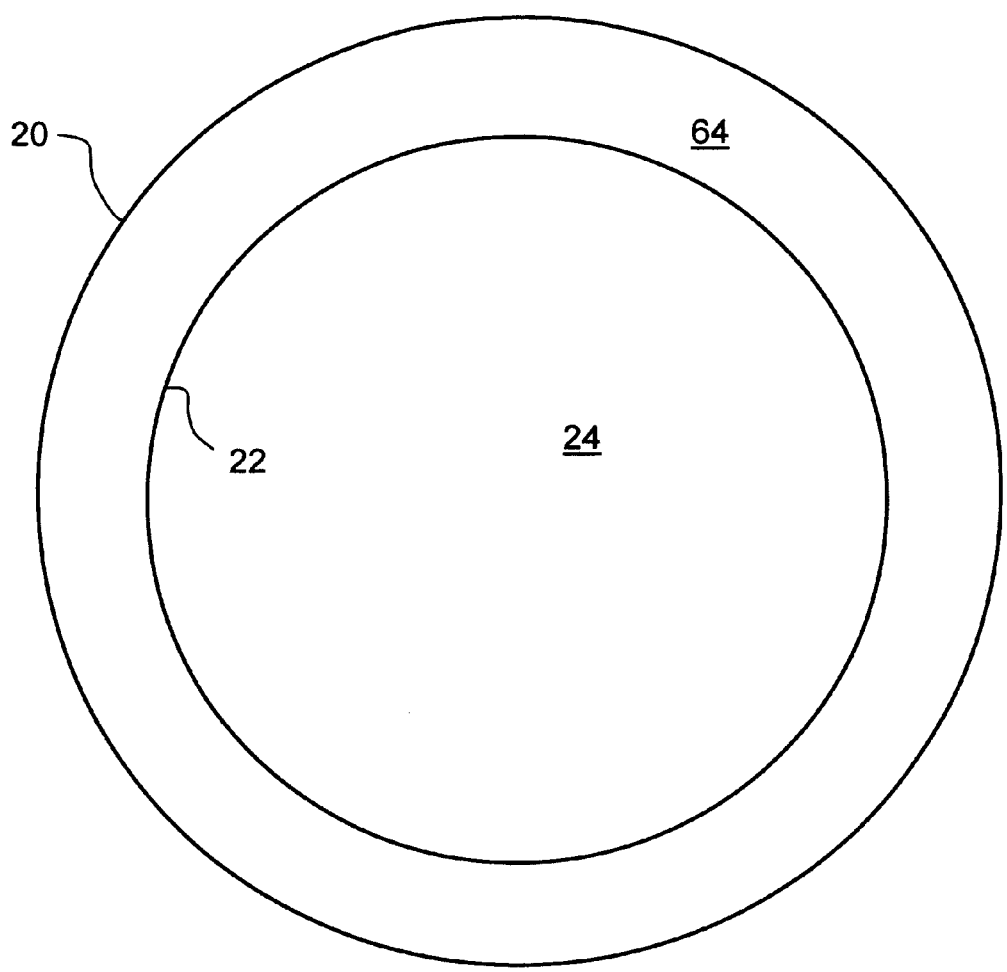

FIG. 9 Front view showing the roots compartment situated between the shell and the exterior of the drum.

DETAILED DESCRIPTION OF THE PREFERRED EMBODIMENT

An orbital hydroponic/aeroponic unit (10) has a housing (12) contained within a structural frame (14). The housing (12) is defined by a pair of fixed rings (16), one situated at each longitudinal ends of the housing (12), and contained within each fixed ring (16) is a rotating ring (18), the outer diameter of each fixed rings (16) being held together by way of a shell (20). Inside the housing (12) is a drum (22) which defines a chamber (24). A rotation motor (26) induces variable rotational speed to the drum (22) by actuating a drive shaft (28) by way of a shaft actuating means (30) which in turns drives a pair of rotating means (32), the means being generally in the form of chains or belts and connecting by way of pulleys or gears (34). The rotating means (32) circumferencially engages a rotating means ring (36) situated at the inner diameter of the rotating ring (18).

The rotating means ring (36) could come in the guise of a large gear. Braces (38) hold the fixed rings (16) to the structural frame (14) onto which are fixedly attached the rotation motor (26); and drive shaft attachment means (29) which generally consist of adjustable bearings in a housing (not shown) as is well known in the art. The adjustable bearings control the tension on the rotating means (32). The structural frame (14) as well as the housing (12) components are designed to be sturdy, lightweight, easy to assemble and compact for shipping. While the structural frame is preferably made of metal, any material can be used. While the rest of the components are generally of polymer such as HDPE, as long as the materials used resist moisture, ultraviolet light, fungus growth and are generally suitable for growing food, they are adequate.

Tie rods (21) serve as the skeleton onto which is applied the shell (20). By tightening nuts on the filleted ends of the tie rods (21) the two fixed rings (16) press against the shell (20) which is guided into grooves (not shown) carved into the interior face of the fixed rings (16) and pressed on <<O>> rings (not shown).

FIG. 8 shows the interface between a fixed ring (16) and a rotating ring (18). It consists of a tongue (17) and groove (19) arrangement wherein the tongue (17) is on the fixed ring (16). Only a very narrow gap is required so as to reduce friction at a minimum while allowing relatively good sealability.

The drum (22) consists of a plurality of parallel planks (40)—each having a plurality of holes (52) generally evenly spaced apart—which can be set at the outer circumference of rotating ring (18) or its inner circumference or even at both places simultaneously. In this manner, a small diameter drum (22') or a large diameter drum (22) can be obtained with the small diameter drum (22') being used for seedlings or smaller plants to bring them closer to a light source (42). When planks (40) are set at both the inner and outer circumferences, care should be taken to provide empty spacing between planks (40) of the inner circumference and no plants on the outer circumference planks (40) where the inner planks (40) cast shadows.

A hatch (46) configured and sized to fit within the inner opening of the rotating ring (18) seals the chamber (24) and provides access to it. The hatch (46) is hingedly attached to the fixed ring (16) by a hinge structure (48) which is configured so as not to interfere with the rotating ring (18), the rotating means (32), or the rotating means ring (36). At the center of the hatch (46) is a light source container (50) which contains the light source (42). The light source container (50) is generally shaped so as to be compatible with the long and cylindrical shape of the chamber (24) and provide even illumination throughout, in other words, it is preferably cylindrical in shape. Also, it is fixedly attached to the center of the hatch (46) and of a length that allows the hatch (46) to be swung opened with the light source container (50) coming along without conflicting with the rotating ring (18). For this reason, there are preferably two light source containers (50) each mating at the center of the drum (22) to provide even illumination along the length of the drum (22). Blowing air provides cooling to the light sources (42) contained within the light source containers (50). Although an orbital hydroponic/aeroponic unit (10) could have only one hatch (46) it is preferable to have two hatches (46) one at each end of the unit (10).

A nutrients tank (not shown) holds a solution of nutrients which is pumped and then expelled as a fine mist into a roots compartment (64) situated between the shell (20) and the exterior of the drum (22). But the mist, which is generated by ultrasound to produce very small droplets of water measured in microns, permeates the air and is totally absorbed by the plants so there is virtually no loss of water. CO2 can also be introduced inside the chamber (24) and the roots compartment (64) to stimulate plant growth.

The housing (12) has several openings: An air intake port (54) which is also used for cooling the light source (42) a fan (not shown) situated proximal the light source (42) can optionally be installed if needed; an air outlet port (56) to provide circulation to the incoming air; nutrients intake port (58) directed at the roots compartment (64); chamber nutrients intake port (60) to provide nutrients inside the chamber (24), this also raises the degree of humidity inside the chamber (24). The air intake port (54) is also used for CO2.

Air pressure is slightly positive inside the roots compartment (64) while it is generally neutral inside the chamber (24), as compared to air pressure ouside the housing (12).

When starting new plants, the planks (40) are positioned on the inner circumference of the rotating ring (18) so as to create the small drum (22') which brings the young sprouts closer to the light source (42). As the plants grow bigger, each plank (40) can be moved onto the larger diameter drum (22) situated on the outer circumference of the rotating ring (18).

The planks (40) have holes (52) into which are inserted the plants using rockwool or <<Jiffy 7>> tabs which are well known planting media for hydroponic or aeroponic. Spacer planks (not shown), which do not have holes (52) in them, fill in spacing between the planks (40) and are generally added as the planks are moved from the smaller drum (22') to the larger drum (22) so as to keep the inside of the drum (22) relatively sealed and separate from the roots compartment (64). Both the planks (40) and the spacer planks (not shown) have attachment means to releasably attach them to the interior faces of the rotating rings (18).

The plant roots are preferably kept in darkness because since they are between the outer side of the drum (22) and the shell (20), this inhibits the growth of fungus on the roots.

The invention claimed is:

1. An orbital hydroponic/aeroponic unit comprising:
   a housing contained within a structural frame;
   said housing defined by a pair of fixed rings, one situated at each longitudinal ends of said housing, and a shell;
   a rotating ring contained within each fixed ring;
   outer diameter of each fixed ring being held together by way of a shell:
   a drum inside said housing defining a chamber;
   a roots compartment defined as space between the inside of said shell and the outside of said drum;
   a hatch configured and sized to fit within an inner opening of said rotating ring to seal said chamber and provide access to it;
   a light source container at the center of said hatch containing a light source;
   said housing having several openings comprising an air intake port;
   an air outlet port to provide circulation to incoming air
   nutrients intake port directed at said roots compartment;
   chamber nutrients intake port to provide nutrients inside said chamber;
   said hatch having a hinge structure to hingedly attach said hatch to said fixed ring;
   said shell being applied onto tie rods and tightening nuts on filleted ends of said tie rods presses said fixed rings against said shell which is guided into grooves carved into the interior face of said fixed rings and messed on O-rings.

2. An orbital hydroponic/aeroponic unit as in claim 1 wherein: said fixed ring and said rotating ring interfacing by way of tongue and groove wherein said tongue being on said fixed ring.

3. An orbital hydroponic/aeroponic unit as in claim 1 wherein:
   said drum consisting of a plurality of parallel planks having a plurality of holes into which plants or seedlings are put in and said planks being set at the outer circumference of rotating ring when plants are large;

and said planks being set at the inner circumference of said rotating ring when plants are small or seedlings.

4. An orbital hydroponic/aeroponic unit as in claim 3 wherein:

spacer planks with no said holes fill in spacing between said planks.

5. An orbital hydroponic/aeroponic unit as in claim 4 wherein:

said drum consisting of a plurality of parallel planks having a plurality of holes and spacer planks with no said holes fill in spacing between said planks;

said planks and said spacer planks having attachment means to releasably attach them to the interior faces of said rotating rings.

6. An orbital hydroponic/aeroponic unit as in claim 3 wherein:

said planks set at both the inner circumference and the outer circumference of said rotaing ring.

7. An orbital hydroponic/aeroponic unit as in claim 1 wherein: a rotation motor inducing rotational speed to said drum by actuating a drive shaft by way of a shaft actuating means in turn driving a pair of rotating means;

said rotating means circumferencially engaging a rotating means ring situated at the inner diameter of said rotating ring.

8. An orbital hydroponic/aeroponic unit as in claim 7 wherein:

said rotating means ring being a large gear.

9. An orbital hydroponic/aeroponic unit as in claim 7 wherein:

an actuating means being generally in the form of chains and connecting by way of gears.

10. An orbital hydroponic/aerponic unit as in claim 7 wherein:

said actuating means being generally in the form of belts and connecting by way of pulleys.

11. An orbital hydroponic/aeroponic unit as in claim 7 wherein:

braces hold said fixed rings to said structural frame

12. An orbital hydroponic/aeroponic unit as in claim 7 wherein:

said structural frame having said rotation motor and drive shaft attachment means fixedly attached to it.

13. An orbital hydroponic/aeroponic unit as in claim 1 wherein:

each hatch has a light source container.

* * * * *